No. 891,168.
PATENTED JUNE 16, 1908.
N. HEE.
VEHICLE SPRING.
APPLICATION FILED JULY 28, 1906.
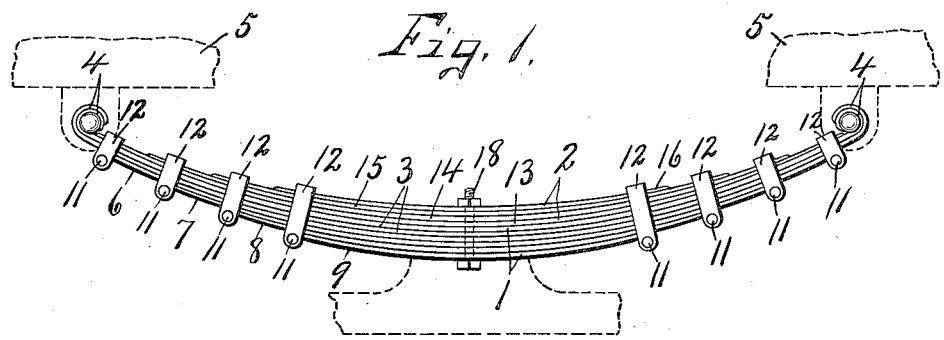
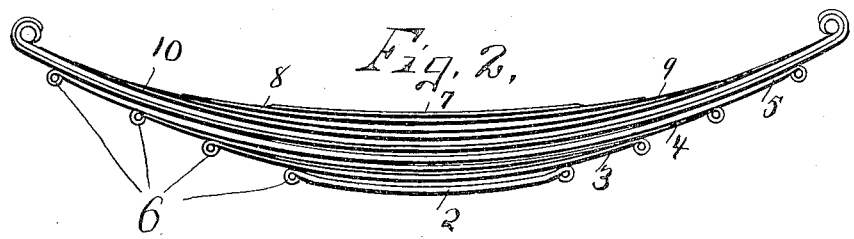
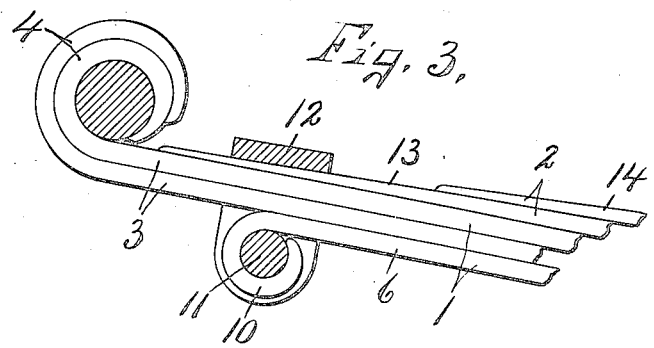
Witnesses.
Inventor.
Nicholas Hee
By.
Howard P. Denison
Attorney.

UNITED STATES PATENT OFFICE.

NICHOLAS HEE, OF BALDWINSVILLE, NEW YORK.

VEHICLE-SPRING.

No. 891,168.   Specification of Letters Patent.   Patented June 16, 1908.

Application filed July 28, 1906. Serial No. 328,203.

*To all whom it may concern:*

Be it known that I, NICHOLAS HEE, of Baldwinsville, in the county of Onondaga, in the State of New York, have invented new and useful Improvements in Vehicle-Springs, of which the following, taken in connection with the accompanying drawings, is a full, clear, and exact description.

This invention relates to certain improvements in combined vehicle spring and shock absorber, in which I have sought to combine in a single spring, two sets of spring leaves co-acting with each other to afford greater resiliency under light loads and gradually increasing resistance under heavy loads, at the same time to render the vertical movement of the body, both upward and downward, less abrupt as the vehicle is passing over obstructions or uneven pavements.

In other words, my object is to provide a combined spring and shock absorber in a single element, which is not only capable of resisting excessive or sudden down-thrust of the body, but also eases the upward or rebound movement of such body, and preventing excessive strains and breakages of the leaves of the spring. This object, more specifically stated, is to provide two semi-elliptical or bow-springs of different initial curvatures, one of which is termed the body-supporting spring, while the other is designated as the shock absorbing spring, so that when the central portions of the two sets of springs are drawn together by the clamp bolt 18 the shock absorbing spring assists or adds to the resiliency of the body-supporting spring to render the action of the latter more easy under a light load, at the same time affording a certain degree of resistance to the upward rebound of the body which is attached to the ends of the lower body-supporting spring.

In the drawings—Figure 1 is a side elevation of my improved vehicle spring and shock absorber. Fig. 2 is a view similar to Fig. 1, the clips or loops being omitted. Fig. 3 is an enlarged detail view of one end of the combined spring and shock absorber seen in Fig. 1, showing particularly the manner of attaching the clamps.

This combined vehicle spring and shock absorber comprises essentially, a lower body-supporting spring represented as a whole at —1— and an upper shock absorbing spring represented as a whole at —2—, each spring being of the semi-elliptical or bow-type arched downwardly from the ends toward the center, although the upper shock absorbing spring is of less initial curvature than that of the lower body-supporting spring.

The lower body-supporting spring is composed of a series of leaves fitting one against the other, when compressed but of different lengths, the two upper leaves, as —3—, being of substantially the same length and terminating at their ends in suitable eyes —4— in which the body, as —5—, shown by dotted lines in Fig. 1, is supported. The remaining leaves, as —6—, —7—, —8— and —9—, which are arranged successively one under the other, are of gradually decreasing lengths from the top downward and each terminates at its opposite ends in suitable eyes —10— which receive the transverse bolts, as —11—, of suitable bands or clips —12—, best seen in Figs. 1 and 3, which carry the spring shock absorber. The shock absorbing spring —2— is also composed of a series of leaves, the lower leaf, as —13—, being the longest and having its ends resting inwardly upon the upper faces of the opposite ends of the upper member of the body-supporting spring —3— close to the eyes —4—, so that when the central portions of both springs are drawn together by said clamping bolts, a certain degree of tension is exerted by the upper spring —2— upon the ends of the body-supporting spring —1— to render the latter more resilient under a light load. The remaining leaves, as —14—, 15—, and 16— of the shock absorbing spring —2— are arranged successively, one upon the other, and upon the leaf 13, and gradually decrease in length from the bottom upward, with their ends so arranged relative to the eyes 10 and clips bearing over and supporting all the ends of all the leaves.

The clips —12— are disposed in substantially radial lines with reference to the arc of curvature of the springs —1— and —2—, and while the ends of the leaves of the spring —2— are free to slide upon each other, and upon the leaves of the spring —1— to which they are not attached by the pins —11—, they nevertheless serve to hold all of the leaves of both springs in contact with each other.

It will be seen from the foregoing description that this combined vehicle spring and shock absorber is particularly simple in construction and effective in operation, both as a shock absorber, to prevent sudden vertical movement of the body of the vehicle, and also to increase the resiliency of the body-supporting spring under a light load, as well as to increase its resisting power under a heavy load.

What I claim is:

A spring of the class described, comprising a body portion formed of a plurality of superposed leaves of upwardly increasing lengths and with eyes at the ends of said body portion leaves, means for connecting said body portion at the ends and centrally thereof to a vehicle, a shock absorber comprising a plurality of leaves of downwardly increasing lengths and bearing upon said body portion, U-shaped clips bearing over the respective leaves of said shock absorber at their ends and likewise over the adjacent portion of the body portion, and pins connecting the terminals of said clips through the eyes of the body portion leaves.

In testimony whereof, I have hereunto signed my name in the presence of two attesting witnesses, at Baldwinsville in the county of Onondaga, in the State of New York, this 26th day of July, 1906.

NICHOLAS HEE.

Witnesses:
C. C. SCHOENECK,
JACOB GRASSMAN.